Patented Apr. 21, 1936                            2,038,400

UNITED STATES PATENT OFFICE 2,038,400

FLOTATION REAGENT

Francis T. Whitworth, Garfield, Utah

No Drawing. Application April 15, 1927,
Serial No. 184,171

24 Claims. (Cl. 209—166)

This invention relates to materials for use in the concentration of mineral ores by the flotation process and the object of the invention is to provide for effective and economical flotation by the use of certain flotation reagents hereinafter described.

It has been proposed to prepare flotation reagents by heating various organic substances with sulphur. This process is known as "reconstruction". One of the principal objects of this invention is to provide an improved reconstructed reagent.

Other objects and advantages will hereinafter appear.

I have found that much superior results are obtained by heating various organic substances containing oxygen with sulphur and phosphorus. The sulphur and the phosphorus may conveniently be combined before the treatment of the organic material is commenced. If free phosphorus is used, however, the red form should be used as the yellow reacts with extreme violence.

It appears that the reasons for the superiority of sulphur and phosphorus over sulphur alone are; first, that more of the sulphur is chemically combined with the organic compound as distinguished from mere solution, and in the second place, more efficient sulphur compounds are formed. Thus, when organic substances such as phenol, cresylic acid, pine oil or the like are heated with sulphur, a certain amount of organic sulphide compounds R—S or R—S$_2$ are formed, although probably the greater part of the sulphur is present in solution. In addition to the sulphide-compounds, very small amounts of sulph-hydrate (R—SH) compounds are formed.

When, however, phosphorus is used which will combine with the oxygen of the hydroxyl or other group of the organic substance, not only is a much larger proportion of sulphur brought into chemical combination but also a far larger proportion of sulph-hydrate is formed which by decomposition and polymerization gives a very complex mixture of thio-compounds.

The preferable phosphorus compound to use is phosphorus pentasulphide due to its large proportion of available sulphur and relatively high acidic properties compared with other sulphur-phosphorus compounds.

The materials used must be free from water to enable the proper reactions to take place. If the cresylic acid or other organic material contains even one or two per cent of water the water decomposes the phosphorus pentasulphide, according to the following equation:

$$P_2S_5 + 8H_2O = 2H_3PO_4 + 5H_2S$$

In preparing my reagent I may use as an organic material almost any compound containing a hydroxyl group such as the aliphatic alcohols or aromatic hydroxyl derivatives, such as phenol, cresol, xylenol, or naphthol. In addition, although I prefer compounds having a hydroxyl group, I may use compounds containing a carboxyl group (—COOH), aldehyde group (—CHO), or the ketone group (—CO). The latter compounds, especially the two last, tend to form organic sulphides completely in place of mixtures and hence are not ordinarily as desirable as the hydroxyl compounds, which tend to form larger proportions of sulph-hydrate compounds and resultant complex decomposition and polymerization products.

It will also be understood that many products, especially those obtained by the destructive distillation of coal (coal tar distillates) and of wood and the by-products thereof, contain compounds such as those above mentioned and may therefore be reconstructed in accordance with this invention. As is well known such distillates contain fractions boiling over a wide range of temperatures and I contemplate the treatment of low boiling and high boiling and of mixtures of high and low boiling constituents.

The reaction products of phosphorus pentasulfide with aliphatic alcohols as well as with aromatic hydroxy compounds are found to have the formula

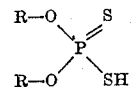

in which R is the organic residue attached to the oxygen containing group. The compounds are therefore dithiophosphoric acids in which the sulphydric groups contain an acidic hydrogen.

The preferred materials are cresol or cresylic acid and phosphorus pentasulphide. The amount of phosphorus pentasulphide which may be caused to react may be as much as 40% or more of the weight of cresylic acid, but I have found that the proportion of phosphorus pentasulphide which it is best to use depends upon the nature of the circuit in which the reagent is to be used. Thus best results were obtained with the following proportions:

20% phosphorus pentasulphide for preparing a product for use in acid pulp.

10% phosphorus pentasulphide for preparing a product for use in neutral pulp.

30% phosphorus pentasulphide for preparing a product for use in alkaline pulp.

I may use lesser amounts of phosphorus pentasulphide in the production of flotation reagents, for example as little at 5% thereof. Instead of using the phosphorus pentasulphide as such, I may substitute therefor the equivalent amounts of phosphorus and sulphur whereby I use about 3% of phosphorus and 1.5% of sulphur, in place of about 5% of phosphorus pentasulphide and corresponding amounts for the higher percentages.

When the reconstructed cresylic acid is to be used in acid circuit, advantageous results are obtained by adding a small amount, say 0.5% of sodium hydroxide or other alkali to the mixture before reconstruction.

The materials are mixed and heated to 180° C., when the product is to be used for flotation in an acid circuit, to give the necessary body to the oil for acid conditions; if the product is to be used for flotation in alkaline circuit the mixed materials are heated to 140° C. As cresylic acid boils at about 190° C. the reaction may be carried out at atmospheric pressure, with a reflux condenser to catch any vapors which might otherwise be carried off. For substances of lower boiling point it may be necessary to heat in a closed still under pressure in order to prevent loss of reagents. The reaction is substantially complete in an hour but further heating is not ordinarily harmful unless continued for three hours or more. At the end of the treatment supernatant liquor, constituting the flotation reagent is drawn off from the still leaving the sludge behind.

The apparatus in which the reconstruction may be carried out and in which the ore is subjected to flotation treatment are so well-known that no illustration of such apparatus is given.

My improved reagents as distinguished from xanthates and other sulphur containing materials, possess frothing as well as collecting ability so that it is not essential to add other oils or frothing agents although such additions may be desirable in certain cases. This is particularly true of substances which before reconstruction have only a slight frothing capacity.

Good results have been obtained with from 0.4 to 0.1 pounds of the product produced as above described per ton of ore.

I have found that my improved reagents, especially reconstructed cresylic acid or cresol, float certain sulphides such as chalcocite very well but inhibit the flotation of pyrite so that a higher grade of concentrate of the desired metal such as copper may be obtained than is otherwise possible.

For purposes of illustration I give in detail the results of practice with a process and apparatus of the mechanical agitation type using ore of the Utah Copper Company containing 0.771 per cent copper combined chiefly as sulphides.

The flotation agent used consisted of the product of reconstructing cresylic acid by heating it with ten per cent solid phosphorus pentasulphide to 140° C. for two hours under a reflux condenser.

Tests were made in acid, neutral and alkaline circuit, and using both the reconstructed product and untreated cresylic acid for comparison. For the acid pulp 5 pounds of 60° Bé. sulphuric acid per ton of dry ore were added. For the alkaline circuit 2 pounds of caustic soda per ton of dry ore were used. In each case the amount of flotation agent used, whether untreated cresylic acid or the reconstructed product thereof, was 0.4 lbs. per ton of dry ore.

The results were as follows:

| Circuit | Tailing percent copper | | |
|---|---|---|---|
| | Acid | Neutral | Alkaline |
| Untreated cresylic acid | .512 | .238 | .251 |
| Reconstructed cresylic acid | .080 | .089 | .072 |

Using 0.6 pound of the product obtained by reconstructing cresylic acid by heating it with 5% sulphur and 0.5% sodium hydroxide, the following results were obtained:

| Circuit | Per cent copper | | |
|---|---|---|---|
| | Acid | Neutral | Alkaline |
| Heading | .774 | .774 | .879 |
| Tailing | .098 | .133 | .182 |

From the above figures it will be seen that when cresylic acid is reconstructed with phosphorus pentasulphide the most efficient results are with an alkaline circuit whereas the reverse is true of cresylic acid reconstructed with sulphur.

Alkaline conditions are also favorable to selective flotation of chalcocite and chalcopyrite, with respect to pyrite. Thus in an alkaline circuit, using the cresol reconstructed with phosphorus pentasulphide only about 48% of the iron is floated while 88% of the copper may be recovered. This difference would be greater but for the iron contained in the chalcopyrite which was floated.

An alkaline circuit is preferable to an acid circuit on account of the fact that in the presence of acid the copper sulphate present corrodes the impellers of the aeration cells and other parts unless rubber covered.

Reconstructed cresylic acid is mentioned as the preferred reagent as it has proved the best on the ore tested but as is well known to those skilled in the art the particular reagent used as well as its amount and method of use vary somewhat according to the nature of the ore treated. The method of treating the organic material with phosphorus pentasulphide is in any case, however, substantially the same as above described but it will of course be evident that the preferred proportion by weight of phosphorus pentasulphide will depend upon the material to be reconstructed. In some cases, instead of using phosphorus pentasulphide in the reconstruction process, corresponding amounts of sulphur and red phosphorus may be used.

In general for successful flotation of metalliferous particles, a definite condition of acidity or alkalinity must be maintained in the ore pulp. This is due to the fact that the reagent in use requires such a conditioned pulp to function in the desired manner. However, if cresylic acid is treated with phosphorus pentasulphide, a complex mixture of cresyl sulphides, disulphides, sulph-hydrates and polymerized thio compounds results which if mixed with ore pulp will select and float metalliferous particles in acid, neutral or alkaline conditions. Thus for general flotation purposes, the necessity of pulp conditioning is eliminated.

I have found that the type and amount of froth desired may be obtained by changing the time and temperature of the reconstruction. The reagents may also be altered to a marked degree by pressure heating and the use of small quantities of oxidizing or reducing agents.

I am aware that the proportions and nature of the ingredients used in making my improved reagents, their methods of manufacture and use may be varied through a wide range without departing from the principles of my invention. Moreover the improvement in the art of flotation above described includes the use of the reaction products produced by the reaction of oxygen-containing organic substances together with sulphur and phosphorus under the conditions stated irrespective of the actual nature of the chemical compounds which may be produced by such reaction.

What I claim is:

1. A process which comprises subjecting metalliferous material to froth flotation in the presence of a phosphorus sulphur compound of an alcohol.

2. A process which comprises subjecting metalliferous material to froth flotation while associated with a reaction product of a phosphorus compound of sulphur with an alcohol of the herein described class.

3. In the art of froth flotation, the herein described step of subjecting metalliferous material to flotation in the presence of a compound formed by reacting phosphorus sulphide with an unsubstituted aliphatic alcohol.

4. In the art of froth flotation, the herein described step of subjecting material to flotation in the presence of a compound formed by reacting phosphorus sulphide with an unsubstituted aliphatic alcohol.

5. A process which comprises the froth flotation of a metalliferous material in the presence of a sulphur-phosphorus compound of an alcohol consisting solely of carbon, hydrogen and oxygen.

6. The method of effecting concentration of minerals by flotation which comprises adding to the mineral pulp a modifying agent consisting of the reaction product of an organic compound containing an aldehyde group (—CHO) together with sulphur and phosphorus and subjecting the resulting mixture to a flotation operation.

7. The method of effecting concentration of minerals by flotation which comprises adding to the mineral pulp a modifying agent consisting of the reaction product of an organic compound containing a ketone group (—CO) together with sulphur and phosphorus and subjecting the resulting mixture to a flotation operation.

8. A flotation reagent consisting of the reaction product of an organic compound containing an aldehyde group (—CHO) together with sulphur and phosphorus.

9. A flotation reagent consisting of the reaction product of an organic compound containing a ketone group (—CO) together with sulphur and phosphorus.

10. A flotation reagent containing the reaction product of an aliphatic oxygen-containing compound with sulphur and phosphorus.

11. A flotation reagent containing the reaction product of an aliphatic oxygen-containing compound with phosphorus pentasulphide.

12. A flotation reagent containing the reaction product of an aliphatic compound containing a hydroxyl group with sulphur and phosphorus.

13. A flotation reagent containing the reaction product of an aliphatic compound containing a hydroxyl group with phosphorus pentasulphide.

14. A flotation reagent containing the reaction product of an aliphatic organic compound containing a CO group with phosphorus pentasulphide.

15. A flotation reagent containing the reaction product of an aliphatic aldehyde with phosphorus pentasulphide.

16. A flotation reagent containing the reaction product of an aliphatic ketone with phosphorus pentasulphide.

17. The method of effecting concentration of minerals by flotation which comprises adding to the mineral pulp a modifying agent containing the reaction product of an aliphatic oxygen-containing compound with sulphur and phosphorus, and subjecting the resulting mixture to a flotation operation.

18. The method of effecting concentration of minerals by flotation which comprises adding to the mineral pulp a modifying agent containing the reaction product of an aliphatic oxygen-containing compound with phosphorus pentasulphide, and subjecting the resulting mixture to a flotation operation.

19. The method of effecting concentration of minerals by flotation which comprises adding to the mineral pulp a modifying agent containing the reaction product of an aliphatic compound containing a hydroxyl group with sulphur and phosphorus and subjecting the resulting mixture to a flotation operation.

20. The method of effecting concentration of minerals by flotation which comprises adding to the mineral pulp a modifying agent containing the reaction product of an aliphatic compound containing a hydroxyl group with phosphorus pentasulphide and subjecting the resulting mixture to a flotation operation.

21. A flotation reagent comprising a phosphorized and sulphurized oxygen containing aliphatic compound.

22. A flotation reagent comprising a phosphorized and sulphurized aliphatic alcohol.

23. A flotation reagent comprising a compound containing the radical

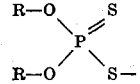

in which R is an aliphatic group.

24. A flotation reagent comprising a compound containing the radical

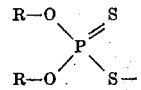

in which R is an alkyl group.

FRANCIS T. WHITWORTH.